(No Model.)  2 Sheets—Sheet 1.

W. T. RIPLEY.
AUTOMATIC SAND AND WATER FEEDING DEVICE FOR STONE SAWING MACHINES.

No. 286,071. Patented Oct. 2, 1883.

Attest:
Walter T. Waldo
F. L. Middleton

Inventor
W. T. Ripley
by Joyce & Spear
Attys (No Model.) 2 Sheets—Sheet 2.
W. T. RIPLEY.
AUTOMATIC SAND AND WATER FEEDING DEVICE FOR STONE SAWING MACHINES.
No. 286,071. Patented Oct. 2, 1883.
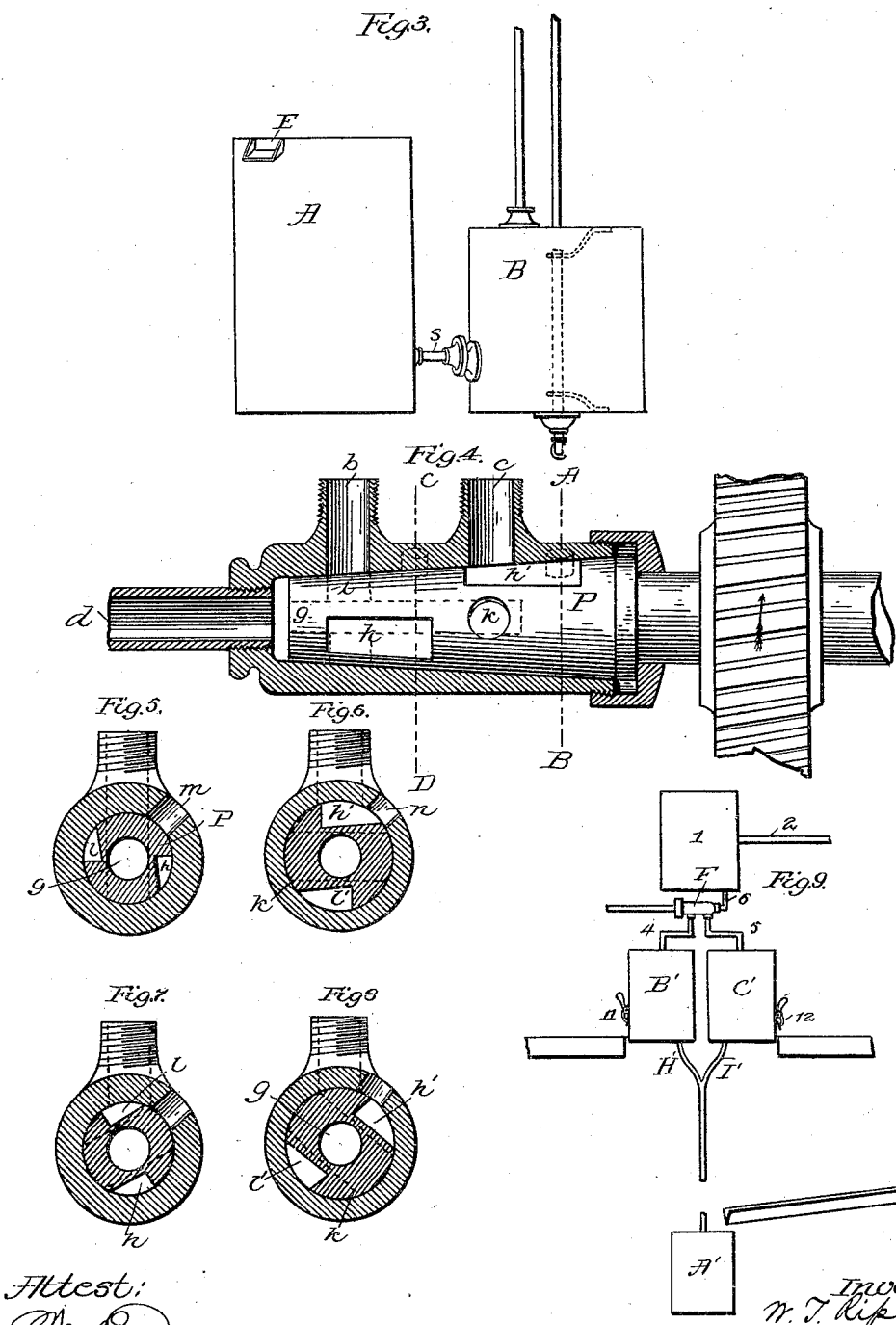

UNITED STATES PATENT OFFICE.

WILLIAM T. RIPLEY, OF RUTLAND, VERMONT.

AUTOMATIC SAND AND WATER FEEDING DEVICE FOR STONE-SAWING MACHINES.

SPECIFICATION forming part of Letters Patent No. 286,071, dated October 2, 1883.

Application filed April 26, 1883. (No model.)

*To all whom it may concern:*

Be it known that I, WILLIAM THOMAS RIPLEY, of Rutland, in the county of Rutland and State of Vermont, have invented a new and useful Improvement in Automatic Sand and Water Feeding Devices for Stone-Sawing Machines; and I do hereby declare that the following is a full, clear, and exact description of the same.

My invention relates to the automatic feeding of sand and water to the saws in a machine for sawing stone.

The object of my invention is to supply the sand to the saws by mechanical appliances, thoroughly mixing and forcing along the sand and water, whereby it is fed uniformly to the saws, and also to use the unwashed sand repeatedly.

Figure 1:
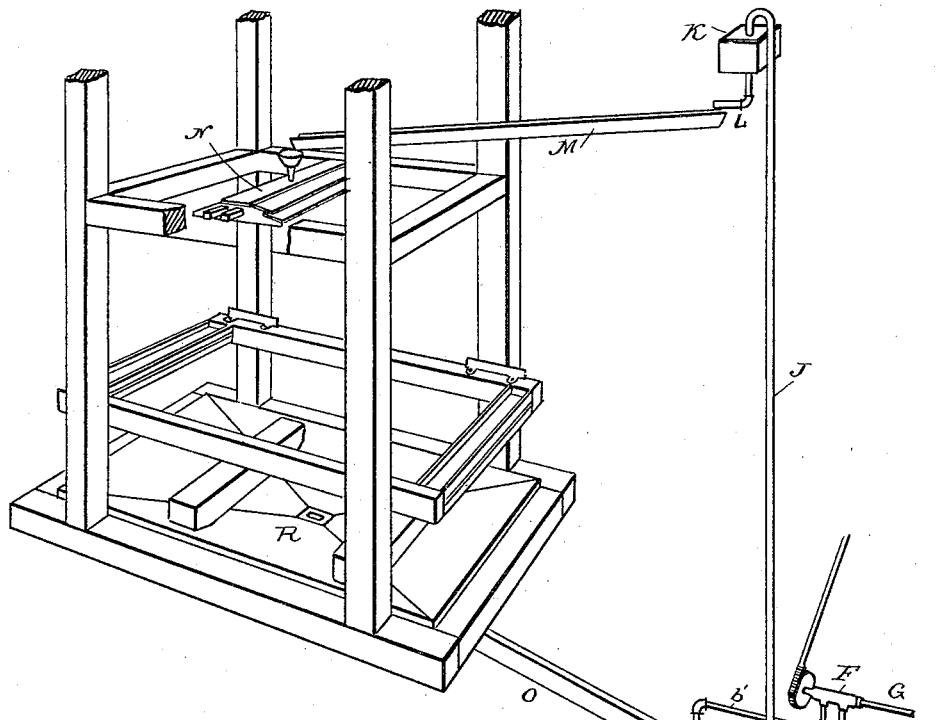
Figure 2:
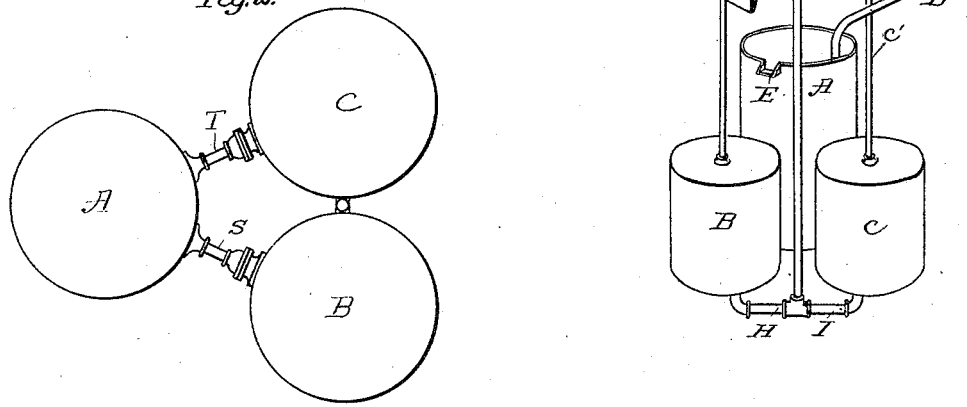

In the accompanying drawings, Figure 1 is a perspective view of the apparatus, showing also its relation to the sawing mechanism. Fig. 2 is a bottom view of the tanks; Fig. 3, a side elevation of the tanks; and Fig. 4 is a side elevation of the valve F, shown in Fig. 1, the case being in central longitudinal section. Figs. 5 and 6 are sections on lines C D and A B, respectively, showing the valve in one position; and Figs. 7 and 8 are sections of the valve on the same lines, showing it in another position. Fig. 9 is a modification.

Fig. 1 shows a distributing-board, N, to which the water and sand are conducted from the pipe or trough M from the tank K. To this tank the mingled sand and water are conveyed by means of the pipe J and its branches H and I from the tanks B C. It will be understood that the sand and water are conveyed from the distributing-board to the gang of saws, and after performing its office upon the stone the water, with the sand and the mud formed in the grinding, is drained from the gang-bed R by the trough O, which connects with the hole in the lower central part of said gang-bed, and emptied into a general receiving-reservoir, A. Fresh water is admitted at the bottom of this reservoir by means of the pipe D, the end of which is located near the bottom. The water therefore boils up through the sinking sand, carrying with it the mud and detritus, and overflows at the gate E, cut in the rim of the tank. Fresh sand is also admitted to this reservoir at a uniform rate by any suitable appliance properly regulated according to the number of gangs running. Only one gang is shown in the drawings; but in practice I prefer to use more gangs with one feeding apparatus, the apparatus being more economically used with from six to ten or more gangs. Both the fresh sand and the mud from the trough O will be passed through a sieve before entering the tank A. The tanks B and C are lower than the tank A, as shown in Fig. 3. They are air-tight and capable of withstanding an internal pressure of thirty pounds per square inch. They are connected with the tank A by means of the pipes S and T. (Shown in Fig. 2.) Within the pipes S T are valves which permit a flow from tank A into the tanks B and C, respectively, but prevent passage in the opposite direction. There are similar valves in the bottom of the tanks B and C, in connection with the pipes H and I, these valves permitting the flow from the tanks into the pipes, but preventing return. By means of this arrangement of the valves the flow is permitted from the tank A, near the bottom, into the tanks B or C, and flow may be caused to take place either from the tank B or C through the pipe H or I into the pipe J, and thence to the tank K. The flow is set in motion from the tank B or C by means of air-pressure, the air being supplied through the pipe G from an air-pump. (Not shown, but which may be of any ordinary construction.) The air is forced through a valve, F, the special construction of which is hereinafter described, and thence passes through the pipe $b'$ or $c'$ either to the tank B or tank C. The valve is adapted to give alternate action, by means of its continuous rotation, to the tanks B and C.

It may be stated generally that the construction of the valve is such that the tank B, for example, may be put in connection with an air-pressure receiver or motor, so as to put the air within the tank under pressure while the tank C is in connection with the atmosphere. Pressure within the tank B closes the valve leading into the tank A and opens the valve leading into the pipe H, thus forcing the flow through the pipe J into the tank K. On the other hand, the tank C, through its pipe $c'$, may be put in connection with the air-pressure while the tank B is in connection with the atmosphere, thereby, in the same manner as before described, starting the flow from the tank C into the pipe J through the pipe I.

It will be obvious, also, that whenever the tank

B or tank C is in connection with the atmosphere, the valve in the pipe leading from A to B or C will open toward B or C, and will permit a flow from tank A to refill either B or C, as the case may be. What is required of the valve F is that it shall at regular intervals put the tanks B and C alternately into connection with the air-pressure. In order to accomplish this by uniform movement and at regular intervals, I have constructed the valve as shown in Fig. 4 and the figures numbered therefrom in order.

In Fig. 4 the valve or plug is shown at P, and the valve seat or case at E'. The pipe $d$ leads to the air-forcing apparatus, and is in connection with a hole, $g$, axially, as shown in dotted lines, in the plug or valve P. The valve-plug is fitted snugly to the casing, and is turned by a spindle adapted to be driven by a worm-gear, as shown more fully in Fig. 1. Two holes are bored through the plug perpendicular to the axis and to each other. The one shown at $i$ (in dotted lines) may be made by turning the plug to register with the opening $b$ when the other is closed. The opening $b$ leads to the pipe $b'$, and the opening $c$ leads to the pipe $c'$. Further rotation will of course reverse these positions and put the hole $k$ into connection with the opening $c$; but as the holes $i$ and $k$ intersect the axial hole $g$, which communicates with the pipe $d$, the rotation of the plug or valve would manifestly put the pipes $b'$ $c'$ alternately into communication with the air-pressure mechanism through the pipe $d$. In the sides of the plug are four excavations, $h$ $h'$ $l$ $l'$. In length excavations $h$ $l$ are sufficient to include the opening $b$ and the opening $m$ through the case to the outer air, so that when either $h$ or $l$ registers with $b$ and $m$ it puts them in communication with each other. In like manner the excavations $h'$ $l'$ cover the openings $c$ and $n$. The excavations $h$ $l$ are on opposite sides of the plug. Supposing the plug to be rotating in the direction of the arrow, Fig. 4, when it reaches the position shown in Figs. 4, 5, and 6, the hole $i$ puts $d$ in connection with $b$ and the air-pressure on tank B. At the same time the excavation $h'$ connects opening $c$ with hole $n$, thus putting tank C in connection with the atmosphere. A quarter-turn will bring hole $k$ to register with $c$, and excavation $h$ to register with $b$ and $m$. This puts the air-pressure on tank C, and tank B in connection with the atmosphere. Another quarter-turn will reverse these conditions, and this reversal and alternate action will continue so long as the valve or plug continues to rotate. The plug being caused to rotate by means of the worm-gear and any suitable power once in four minutes will cause a reversal once in thirty seconds.

I have shown the pipe D as supplying fresh water to the tank A; but the mechanism for supplying the sand is not shown. Any suitable means may be used for this purpose. The fresh sand, or sand freshly supplied, and the unworn sand which has once been used and has been brought down by the trough O all sink to the bottom, while the mud and detritus are carried up by the agitation of the water and go off with the overflow at E. Supposing the tanks to be full of sand and water and the valve F so placed that the tank B is in connection with the air-pressure, pressure is then generated upon the surface of the sand and water in the tank B, and the contents at the bottom are forced out through the pipe H, but cannot enter the tank C by reason of the valve in the bottom, which opens outward from the tank. It is therefore driven up the pipe J into the tank K, from which it runs through pipe L and trough M to the distributing-board. After doing its work under the saws it is returned to the receiver A, to be washed and again used. Recurring to the action of the valve after thirty seconds from the operation above described, the valve is turned automatically so that the tank C is in connection with the air-pressure and the tank B with the atmosphere through the mechanisms heretofore described. The mingled sand and water now flow from C by the pipe, while the pressure in the tank B is reduced, and sand and water are forced into B by the greater height of the tank A. At the end of another period of thirty seconds the valve is in the position with which we started, and C is filled from tank A, while B is emptied. The arrangement of the parts upon the valve is such that each of the tanks C and B is opened to the air-pressure a few seconds before the other is closed, so that there is no interruption in the flow. In practice there would of course be several of the pipes L from the elevated tank K, and as many troughs M leading to the different gangs. The flow through all or any of these pipes may be checked by a clap-valve. There should also be a waste-pipe to receive whatever overflow there may be from the tank K. The amount of water forced up into the tank K may be regulated by regulating the speed of the air force-pump in any suitable manner well known to those skilled in the art.

When the apparatus has been at rest for some time, the sand packs firmly at the bottom about the outlets of the tanks B and C. To start this packed sand I provide suspended pipes P' P', one in each of the tanks B and C. The pipes are open at both ends, and the lower end is just over the valve-opening in the bottom of the tank. The sand packed in the bottom will cover the lower end of the suspended pipe, while the upper end will be above the sand, opening into the water. When the air-pressure is applied in the top of the tank, water will be forced through the pipe P' and will cut away the thin layer of sand about the valve-opening, leaving a free passage for the current.

Instead of forcing the water and sand by means of air under pressure, I may, instead, exhaust the air and use the pressure of the atmosphere upon the column of sand and water. The modified apparatus required for this purpose is shown in Fig. 9. In this drawing the tank marked 1 is an exhaust-chamber, in which the pressure is always below that of the atmosphere. Tanks B' and C' are the alternately acting receiving and forcing chambers corresponding to tanks B and C in the form heretofore described. These are in communication by branch pipes H' I' of pipe T with the general receiving-tank A'. Air is constantly exhausted through the exhaust-pipe 2 from the exhaust-tank by means of a mercury-pump or other suitable air-pumping device. The valve F' is in construction and location the same as the valve F in the form hereinbefore described. It is connected to the tanks B' C' by pipes 4 5 and to tank 1 by pipe 6. The tanks B' and C' are therefore alternately exhausted, and upon exhaustion from one or the other that exhausted is filled by the pressure of air upon the surface of the sand and water in the tank A'. At the same time that one tank is thus exhausted and filled, the other, through valve F', is open to the atmosphere, which lets the sand and water flow out at valve 11 or 12, as the case may be.

The purpose of the exhaust-tank 1 is that there may be a considerable degree of exhaustion before the tank B' or tank C' is opened to it. By this means the flow is made more certain, and the water, going up with a sudden rush, takes more sand with it.

It will be understood that the tanks B' and C' are sufficiently elevated so that the sand and water may flow therefrom to the distributing-reservoir. The tank 1 may be dispensed with, though not with so good effect.

Instead of air, any other suitable fluid may be used. For example, I may use water under suitable head or pressure, and operating through the pipes and valve in the same manner substantially as hereinbefore described.

In using water, the sand should be supplied to the forcing tank or tanks in less diluted condition, so as not to cause an excess of water in the stream delivered to the saws. I prefer, however, to use the air as a forcing medium.

I am aware that some of the features shown in the above-described apparatus have been used for elevating water, being shown in the patent of Ayers, No. 114,092, of 1871; and my invention in respect to this part of the apparatus consists in the application of this device to the raising of sand and water for supplying the sand to the saws. The apparatus is especially adapted to this purpose, for the reason that it acts upon the sand and water without permitting the sand to come in contact with the working mechanism of the forcing apparatus, and thereby subjecting them to great wear, or interfering entirely with their mechanisms. Further, the pressure of the air in this apparatus is made to act directly and forcibly upon the sand and water in such a manner as to thoroughly mix them and force them along together, so that the sand is supplied evenly and uniformly to the saws.

Having thus described my invention, what I claim as new, and desire to secure by Letters Patent, is—

1. In combination with the sawing mechanism, a closed tank or tanks for the sand and water, provided with suitable valves, and connected with a source of sand and water supply, connections between said closed tank or tanks and the distributing-board of the sawing mechanism, and an apparatus for applying pressure upon the sand and water within the closed tank or tanks, whereby the sand and water are commingled and forced to the saws, all substantially as described.

2. The combination of the stone-sawing apparatus, mechanism for supplying mingled sand and water to the saws, a sand-washing apparatus, a trough leading from the gang-bed to the washing apparatus, and connections between the washing-tank and the mechanism which supplies the sand and water to the saws, whereby the sand may be washed and used repeatedly, substantially as described.

3. The combination of the washing-tank A, connected with the gang-bed, the closed forcing-tanks B and C, with their valves, connected to the washing-tank, a valve, F, and pipes leading to the forcing-tanks, and an air-forcing apparatus for forcing mingled water and sand to the saws, the parts being combined and operating in the machine substantially as described.

4. The combination of the sawing apparatus, the trough O, the washing-tank A, the closed forcing-tanks B and C, the pipe J, connected to the tanks B and C and leading to the parts which supply the sand and water to the saws, the valve F and pipes connecting it with the said tanks B and C, and an air-forcing apparatus, the whole being constructed and arranged as set forth.

5. The washing-tank A, in combination with the trough leading from the gang-bed and emptying into the upper part of said tank, the pipe leading from the bottom of said tank to the mechanism for raising the sand and water to the saw, (said tank being also adapted for suitable overflow, B,) and a supply-pipe, D, extending from the top to near the bottom of said tank, whereby the sand is washed and returned continuously to the elevating mechanism.

6. In connection with the closed tanks B and C, the suspended pipes P P, open at both ends, and arranged with the lower end over the valve-opening, in combination with the forcing apparatus, substantially as described.

In testimony whereof I have signed my name to this specification in the presence of two subscribing witnesses.

WILLIAM T. RIPLEY.

Witnesses:
CORNELIA A. RIPLEY,
MARY RIPLEY PEASE.